United States Patent
Itoh (10) Patent No.: US 12,485,738 B2
(45) Date of Patent: Dec. 2, 2025

(54) VEHICLE

(71) Applicant: TOYOTA JIDOSHA KABUSHIKI KAISHA, Toyota (JP)

(72) Inventor: Daisuke Itoh, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 328 days.

(21) Appl. No.: 18/371,505

(22) Filed: Sep. 22, 2023

(65) Prior Publication Data

US 2024/0116345 A1    Apr. 11, 2024

(30) Foreign Application Priority Data

Oct. 7, 2022    (JP) .................... 2022-162675

(51) Int. Cl.
*B60K 1/00*    (2006.01)
*B60R 16/02*    (2006.01)

(52) U.S. Cl.
CPC ............ *B60K 1/00* (2013.01); *B60R 16/0207* (2013.01)

(58) Field of Classification Search
CPC ............................ B60K 1/00; B60R 16/0207
See application file for complete search history.

(56) References Cited

U.S. PATENT DOCUMENTS

| | | | |
|---|---|---|---|
| 9,440,593 B2 * | 9/2016 | Sakamoto | B60L 50/66 |
| 9,718,356 B1 * | 8/2017 | Ikeda | B60K 17/16 |
| 10,189,353 B2 * | 1/2019 | Sakamoto | B60K 28/14 |
| 11,091,037 B2 * | 8/2021 | Yuki | H02K 5/225 |
| 11,440,394 B2 * | 9/2022 | Yaguchi | B60K 6/26 |
| 2015/0107920 A1 * | 4/2015 | Sakamoto | B60L 3/003 903/951 |
| 2017/0015199 A1 * | 1/2017 | Shiba | B60K 6/40 |
| 2017/0355272 A1 * | 12/2017 | Baba | B60L 3/0015 |
| 2018/0201108 A1 * | 7/2018 | Okuda | B60L 50/66 |
| 2020/0238930 A1 * | 7/2020 | Yamanaka | H02B 1/46 |
| 2024/0116345 A1 * | 4/2024 | Itoh | B60R 16/0207 |
| 2024/0123805 A1 * | 4/2024 | Ryoo | B60K 1/00 |

FOREIGN PATENT DOCUMENTS

| | | |
|---|---|---|
| JP | 2011-025863 A | 2/2011 |
| JP | 6222178 B2 | 11/2017 |
| JP | 2020-050196 A | 4/2020 |

* cited by examiner

*Primary Examiner* — Erez Gurari
(74) *Attorney, Agent, or Firm* — Dinsmore & Shohl LLP (57) ABSTRACT

The vehicle may include an electric power control unit configured to supply electric power to a motor. The vehicle may comprise a rear bracket located behind the electric power control unit and fixing the electric power control unit to the power unit. The vehicle may comprise a cable configured to supply high voltage electric power to the electric power control unit. The rear bracket may comprise a plate-shaped base portion and a support portion, the base portion is located along an upper surface of the power unit, and the support portion extends upward from the base portion and is located along a rear surface of the electric power control unit. An outer peripheral edge of the base portion may include a first specific edge that extends along a vehicle width direction and opposes the cable in the vehicle front-rear direction. The first specific edge may be curled or chamfered.

5 Claims, 6 Drawing Sheets

VEHICLE

CROSS-REFERENCE TO RELATED APPLICATIONS

This application claims priority to Japanese patent application No. 2022-162675, filed on Oct. 7, 2022, the entire contents of which are incorporated herein by reference.

BACKGROUND ART

The present disclosure relates to a vehicle including a front compartment in which a traction motor and an electric power control unit configured to drive the motor are mounted.

Japanese Patent No. 6222178 describes a structure in which a power unit and an electric power control unit are mounted in a front compartment of a vehicle. A traction motor is accommodated in the power unit. The electric power control unit includes an inverter, a step-up converter, and the like, and supplies electric power to the motor. In the technique disclosed in Japanese Patent No. 6222178, the electric power control unit is fixed above the power unit. A front portion and a rear portion of the electric power control unit in a vehicle front-rear direction are supported by a front bracket and a rear bracket. A cable which supplies high voltage electric power is connected to the electric power control unit.

SUMMARY

The edge of the rear bracket close to the rear of the vehicle may oppose the high-voltage cable in the vehicle front-rear direction. In this case, when front collision occurs, there is a risk that the rear bracket moves toward the rear of the vehicle, the edge of the rear bracket and the cable come into contact with each other, and the cable is damaged.

A vehicle, which is a subject of the technique disclosed herein, may comprise a body including a front compartment. The vehicle may comprise a power unit disposed in the front compartment and accommodating at least a traction motor. The vehicle may comprise an electric power control unit disposed on an upper surface of the power unit and configured to supply electric power to the traction motor. The vehicle may comprise a rear bracket located behind the electric power control unit in a vehicle front-rear direction and fixing the electric power control unit to the power unit. The vehicle may comprise a cable connected to the electric power control unit and configured to supply high voltage electric power to the electric power control unit. The rear bracket may comprise a plate-shaped base portion and a support portion, the base portion is located along an upper surface of the power unit, and the support portion extends upward from the base portion and is located along a rear surface of the electric power control unit. An outer peripheral edge of the base portion may include a first specific edge that extends along a vehicle width direction and opposes the cable in the vehicle front-rear direction. The first specific edge may be curled or chamfered.

According to the above structure, in the case where the first specific edge comes into contact with the cable, the contact area can be made larger as compared to the case where the first specific edge is not curled or chamfered. When the first specific edge comes into contact with the cable, a load applied to the cable can be spread, thus damage to the cable can be suppressed.

DETAILED DESCRIPTION

In an aspect of the vehicle disclosed herein, the first specific edge may be curled with a radius of curvature equal to or greater than a thickness of the base portion. According to this configuration, when the first specific edge comes into contact with the cable, the contact area can suitably be increased. A load applied to the cable can be spread.

In an aspect of the vehicle disclosed herein, the first specific edge may be curled such that an end surface of the first specific edge is not at a rearmost position in the vehicle front-rear direction. According to this configuration, it is possible to prevent the end surface of the first specific edge from coming into contact with the cable. Since it is possible to prevent a situation in which a concentrated load is applied to the cable by the end surface, damage to the cable can be suppressed.

In an aspect of the vehicle disclosed herein, the outer peripheral edge of the base portion further may include a second specific edge extending along the vehicle width direction and opposing the cable in the vehicle front-rear direction. The second specific edge may be located forward of the first specific edge in the vehicle front-rear direction. The second specific edge may not be curled. When a front collision occurs, the second edge is less likely to come into contact with the cable as compared to the first specific edge. According to this configuration, since the second specific edge is not curled, the processing difficulty of the rear bracket can be reduced. The manufacturing cost of the rear bracket can be reduced.

In an aspect of the vehicle disclosed herein, the first specific edge may be chamfered by a chamfer amount equal to or less than half of a thickness of the base portion. According to this configuration, when the first specific edge comes into contact with the cable, the contact area can suitably be increased. Damage to the cable can be suppressed.

First Embodiment (Schematic Structures of Power Control Unit 20 and Motor Housing 30)

Figure 1:
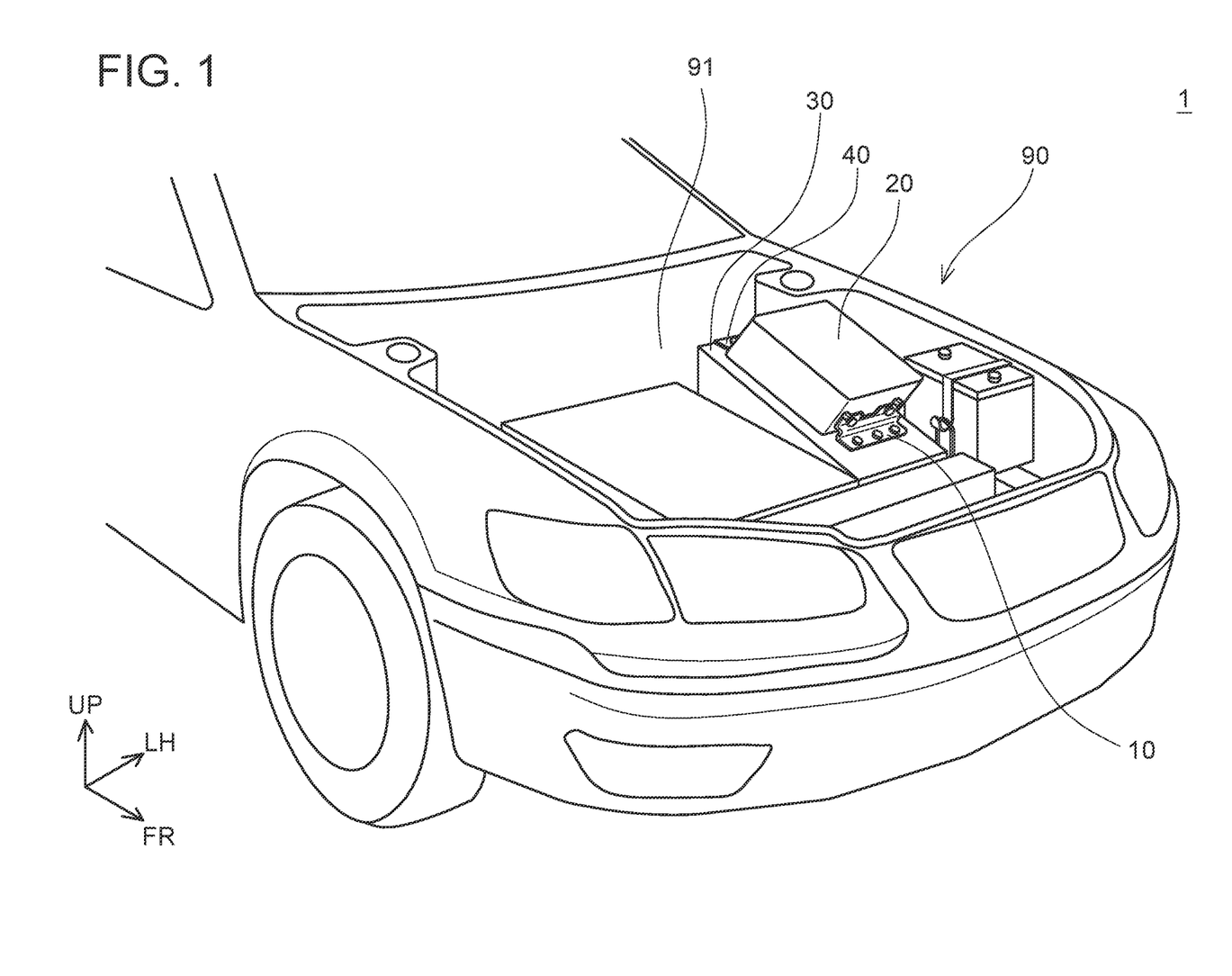
FIG. 1 is a perspective view showing an example of a component layout of a front compartment 90.

An electric vehicle 1 of an embodiment will be described with reference to FIG. 1. In the coordinate system in FIG. 1, FR indicates the front of the vehicle, UP indicates the upper side of the vehicle, and LH indicates the left in a vehicle width-direction. Signs in the coordinate system have the same meaning in the subsequent figures. The electric vehicle 1 herein includes a hybrid vehicle and a fuel cell vehicle in addition to an electric automobile.

The electric vehicle 1 includes a front compartment 90 at a front portion of the vehicle. The front compartment 90 is separated from a cabin by a dash panel 91. The front compartment 90 accommodates an electric power control unit 20 and a motor housing 30. Although various other devices are arranged in the front compartment 90, a description thereof will be omitted. Further, for simpler explanation, the "electric power control unit 20" may be abbreviated and referred to as "PCU 20" hereinafter. The PCU is an abbreviation for Power Control Unit.

The motor housing 30 is, for example, a case created by die casting of aluminum or by milling of aluminum. The motor housing 30 accommodates at least a traction motor 3. The PCU 20 is disposed on an upper surface of the motor housing 30. The PCU 20 is a device configured to drive the motor 3. More specifically, after stepping up electric power of a high-voltage battery (not shown), the PCU 20 converts the stepped-up electric power to AC electric power and supplies the same to the motor 3. The PCU 20 may also convert the AC electric power generated by the motor 3 into DC electric power and then further step down the DC electric power. The high-voltage battery is charged by the stepped-down electric power.

Figure 2:
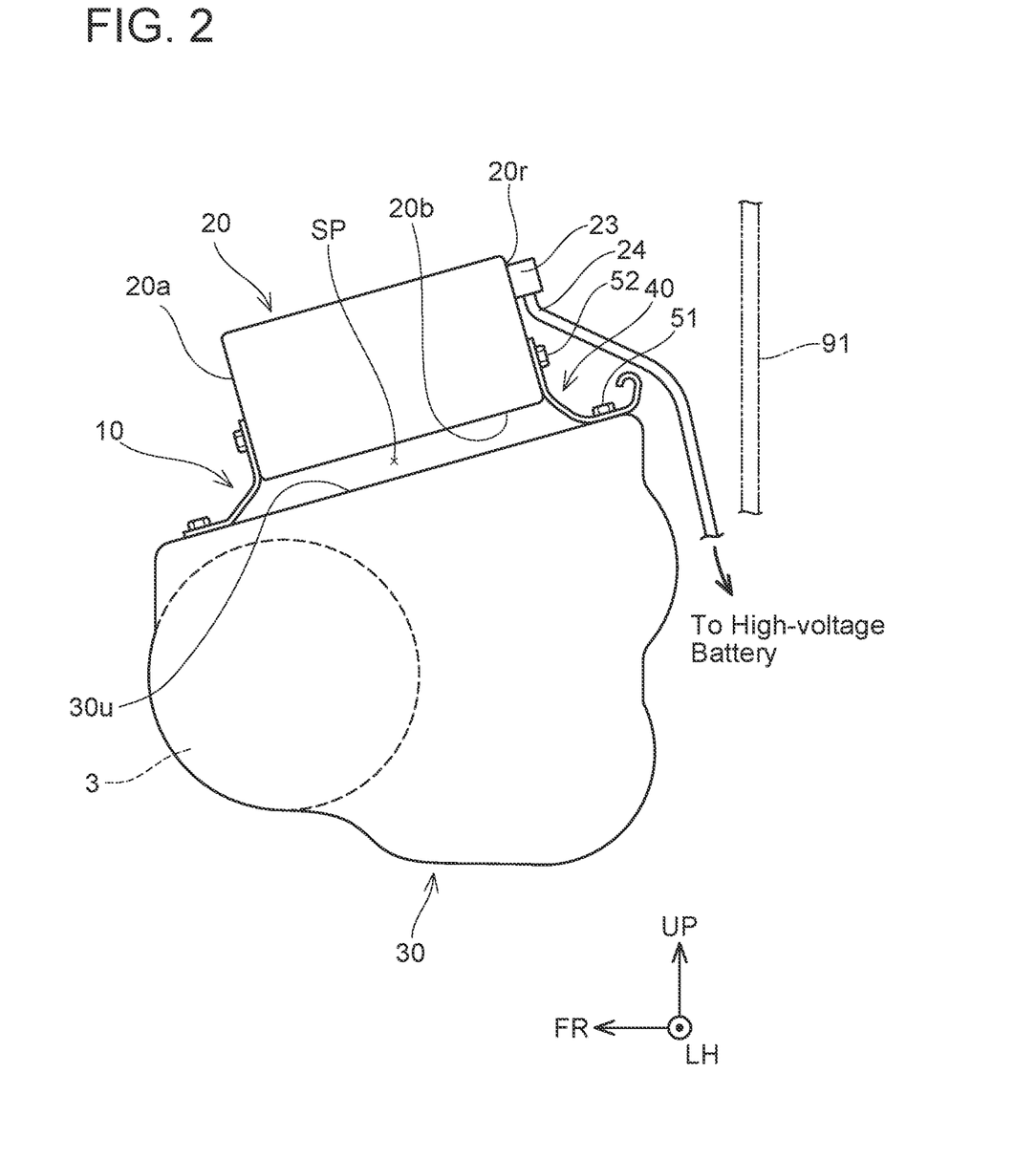
FIG. 2 is a side view of a PCU 20 and a motor housing 30.

FIG. 2 shows a side view of the PCU 20 and the motor housing 30. In FIG. 2, a part of the dash panel 91 is shown in phantom for an illustrative purpose. As described above, the motor 3 is accommodated in the motor housing 30. A front bracket 10 supports a front surface 20a of the PCU 20. A rear bracket 40 supports a rear surface 20r of the PCU 20. The structure of the rear bracket 40 will be described later. A space SP is provided between a lower surface 20b of the PCU 20 and the motor housing 30. An upper surface 30u of the motor housing 30 is inclined downward toward the front. Therefore, the PCU 20 supported above the upper surface 30u is also disposed such that it is inclined downward toward the front.

The cable 24 is connected to a terminal box 23 disposed on the rear surface 20r of the PCU 20. The cable 24 passes through a space behind the rear bracket 40 with respect to the vehicle between the rear bracket 40 and the dash panel 91, and is connected to the high-voltage battery (not shown). The cable 24 is a cable configured to supply high-voltage electric power to the PCU 20. Here, the "high voltage" refers to an operating voltage that is greater than DC 60 V and is equal to or less than 1500 V or is greater than AC 30 V (effective value) and is equal to or less than 1000 V (effective value). In the present embodiment, the cable 24 having a high-voltage of DC 650 V. Since high voltage electric power passes through the cable 24, it is desirable that the cable 24 is prevented from being damaged when the electric vehicle 1 collides. This is to avoid exposing a high-voltage conductor inside the cable 24.

(Structure of Rear Bracket 40)

Figure 3:
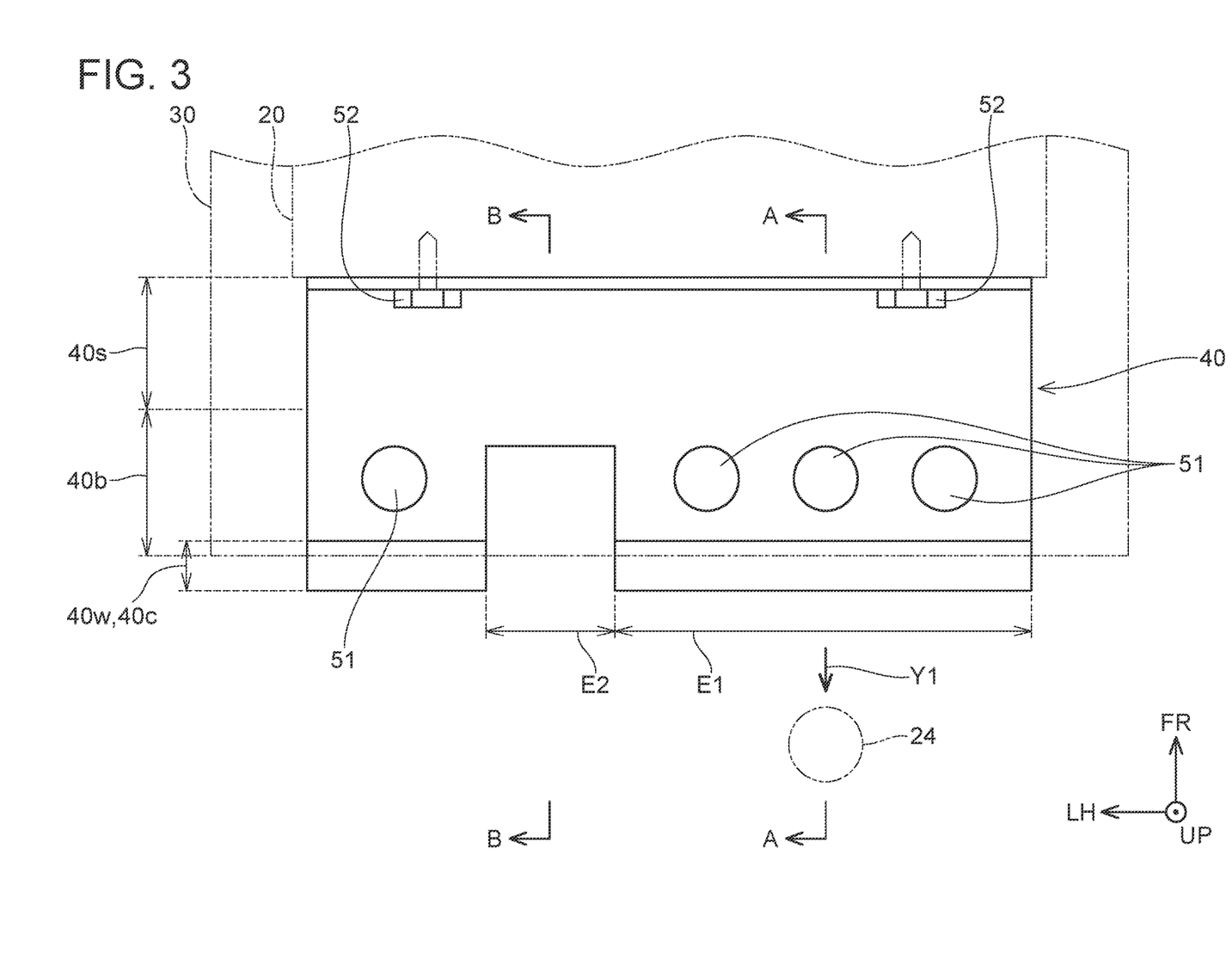
FIG. 3 is a top view of a rear bracket 40.
Figure 4A:
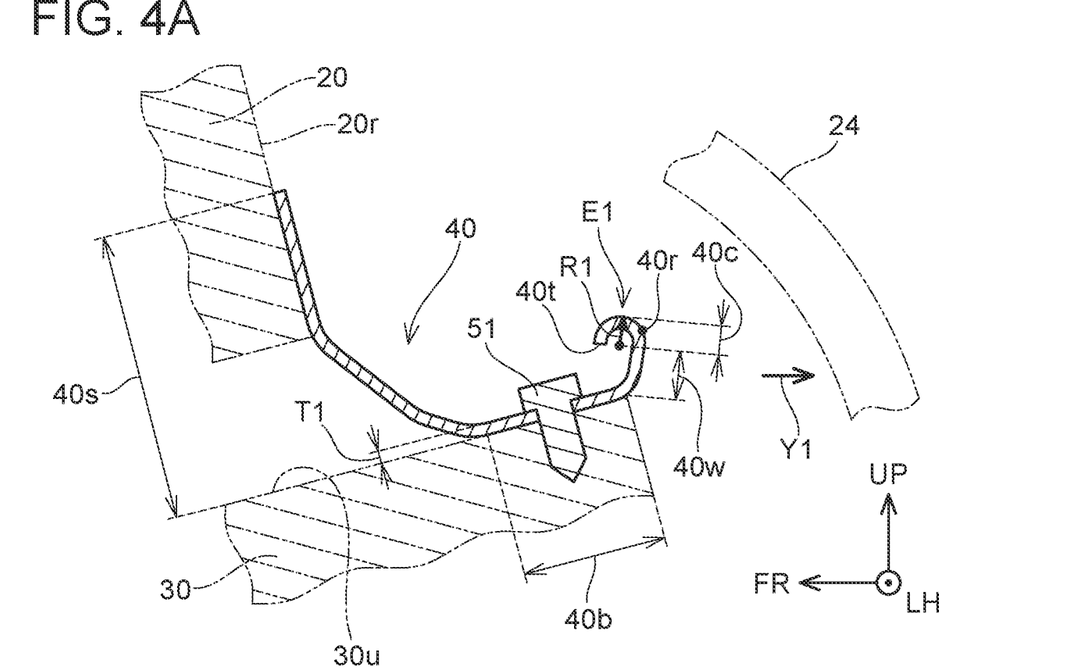
FIG. 4A is a cross-sectional view of the rear bracket 40.
Figure 4B:
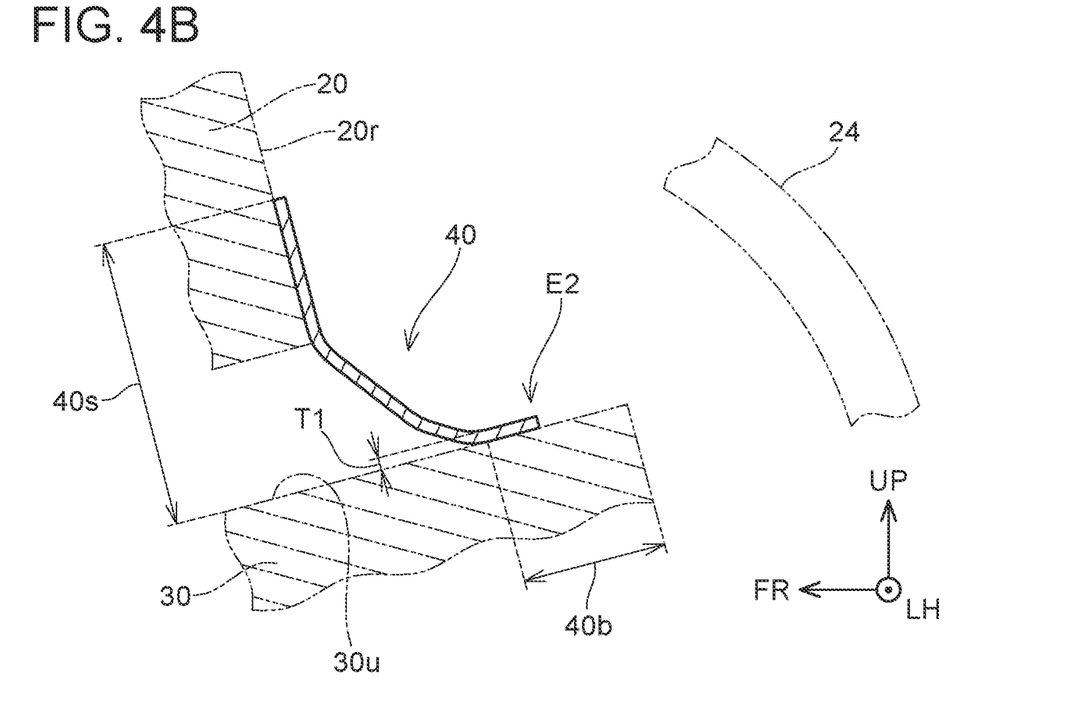
FIG. 4B is a cross-sectional view of the rear bracket 40.

A structure of the rear bracket 40 will be described with reference to FIGS. 3 and 4A and 4B. FIG. 3 is a top view of the rear bracket 40. FIG. 4A and FIG. 4B are cross-sectional views taken along an A-A line and a B-B line of FIG. 3, respectively. That is, FIG. 4A is a cross-sectional view of a first specific edge E1 to be described later, and FIG. 4B is a cross-sectional view of a second specific edge E2. In FIGS. 3 and 4, portions of the cable 24, the electric power control unit 20, and the motor housing 30 are shown in phantom for an illustrative purpose.

The rear bracket 40 is formed by pressing a metal plate (steel plate). The rear bracket 40 includes a base portion 40b and a support portion 40s. The base portion 40b is a plate-shaped portion located along the upper surface 30u of the motor housing 30. The base portion 40b is fixed to the upper surface 30u by bolts 51. The support portion 40s extends upward from the base portion 40b. The support portion 40s includes a portion located along the rear surface 20r of the PCU 20. An upper portion of the support portion 40s is fixed to the rear surface 20r by bolts 52.

As shown in FIG. 3, the outer peripheral edge of the base portion 40b includes a first specific edge E1 and a second specific edge E2. The first specific edge E1 and the second specific edge E2 are edges extending along the vehicle width direction and opposing the cable 24 in the vehicle front-rear direction. The second specific edge E2 is located forward of the first specific edge E1 with respect to the vehicle.

A width of the base portion 40b in the vehicle front-rear direction is smaller in the area where the second specific edge E2 is formed than in the area where the first specific edge E1 is formed. In other words, defining the second specific edge E2 defines a notch in the base portion 40b. The effect of this notch will be described. First, by reducing the material, the rear bracket 40 can be reduced in weight. Second, the rear bracket 40 can be deformed by the notch when a collision load of a predetermined magnitude or more is received. Accordingly, a part of the collision load can be received by the deformation of the rear bracket 40. Since the load concentration on a connection portion between the rear bracket 40 and the motor housing 30 can be prevented, damage to the connection portion can be suppressed.

The cross-sectional shape of the first specific edge E1 will be described with reference to FIG. 4). At the first specific edge E1, an upright wall portion 40w and a curled portion 40c are formed. The upright wall portion 40w and the curled portion 40c are formed over the entire length of the first specific edge E1 in the vehicle width direction. The upright wall portion 40w can increase strength of the base portion 40b formed from a metallic plate.

The curled portion 40c is a portion formed by a curling process. The curled portion 40c has a configuration in which the end surface 40t of the first specific edge E1 is rounded toward the front of the vehicle. Further, the curled portion 40c includes a rear end portion 40r which is at the rearmost position with respect to the vehicle. The end surface 40t is located forward of the rear end portion 40r with respect to the vehicle. In other words, the first specific edge E1 is curled such that the end surface 40t is not positioned at the rearmost position with respect to the vehicle.

In addition, the first specific edge E1 is curled with a radius of the curvature R1. The radius of—curvature R1 is set to be equal to or larger than a thickness T1 of the base portion 40b.

The cross-sectional shape of the second specific edge E2 will be described with reference to FIG. 4B. At the second specific edge E2, neither the upright wall portion 40w nor the curled portion 40c is formed. That is, the second specific edge E2 is not curled. The effect thereof is explained. The second specific edge E2 is located forward of the first specific edge E1 with respect to the vehicle. Thus, when a front collision occurs, the second specific edge E2 is less likely to come into contact with the cable 24 than the first specific edge E1. Therefore, although the specific edge E2 does not include the curled portion, this will cause little problem. Since the curling process to the second specific edge E2 can be omitted, the processing difficulty of the rear bracket 40 can be reduced. The manufacturing cost of the rear bracket 40 can be reduced.

Effect

The effect of the curled shape will be described. When the electric vehicle 1 collides at its front (or at its oblique front), the rear bracket 40 may move toward the rear of the vehicle together with the PCU 20 (see an arrow Y1 in FIGS. 3 and 4A and 4B). There is a risk that the cable 24 is held between the first specific edge E1 of the rear bracket 40 and member(s) (e.g., the dash panel 91) arranged behind the cable 24 with respect to the vehicle. At this time, if the end surface 40$t$ of the rear bracket 40 comes into contact with the cable 24, a concentrated load is applied to the cable 24 by the end surface 40$t$, and the cable 24 may be damaged or disconnected. This is not desirable from the viewpoint of collision safety since a high voltage is applied to the cable 24. Therefore, in the technique of the first embodiment, the first specific edge E1 that may come into contact with the cable 24 in the event of a collision is curled. As a result, the end surface 40$t$ can be hidden inside the rear bracket 40 so that the end surface 40$t$ is not at the rearmost position with respect to the vehicle. Therefore, even when the first specific edge E1 comes into contact with the cable 24, it is possible to prevent the end surface 40$t$ from coming into contact with the cable 24. Since a situation in which a concentrated load is applied to the cable 24 by the end surface 40$t$ can be prevented, the cable 24 can be prevented from being damaged.

Further, the radius of curvature R1 of the curled portion 40$c$ is set to be equal to or greater than the thickness T1 of the base portion 40$b$. This makes it possible to suitably increase the contact area when the curled portion 40$c$ comes into contact with the cable 24. By spreading a load applied to the cable 24, damage to the cable 24 can be suppressed.

The rearmost position of the base portion 40$b$ with respect to the vehicle is a position where the worker is likely to touch. Further, this is a position where it is necessary to improve the coating quality in order to prevent rust and the like. According to the technique of the present embodiment, the curled portion 40$c$ can be at the rearmost position with respect to the vehicle. Since the curled portion 40$c$ is not as sharp as the end surface 40$t$, it is possible to prevent an injury when the worker touches. In addition, the curled portion 40$c$ can have a thicker coating film than the end surface 40$t$, and thus improved coating quality can be achieved.

Variant of First Embodiment

Figure 5:
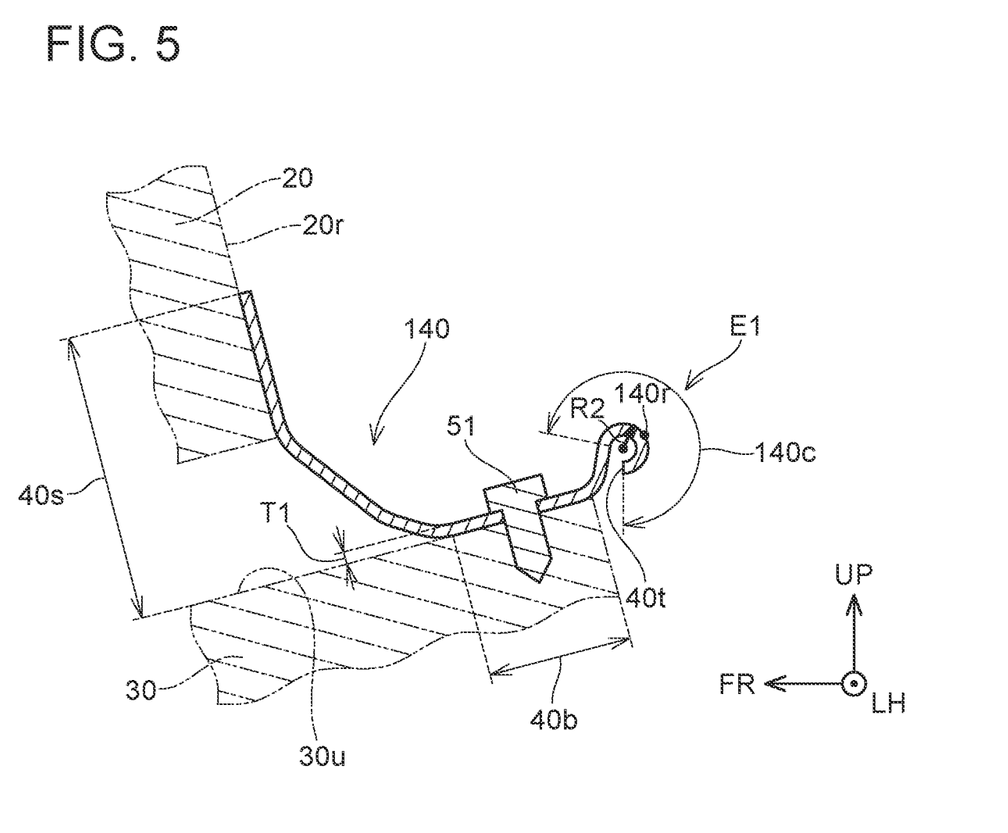
FIG. 5 is a cross-sectional view of a rear bracket 140.

FIG. 5 is a cross-sectional view of a rear bracket 140 of a variant. FIG. 5 is a cross-sectional view at a position similar to that of FIG. 4A. In the curled portion 40$c$ (FIG. 4A) of the first embodiment, the end surface 40$t$ is rounded toward the front of the vehicle. On the other hand, a curled portion 140$c$ (FIG. 5) of the variant has a configuration in which the end surface 40$t$ is rounded toward the rear of the vehicle. It should be noted that parts common to the present variant and the first embodiment are denoted by common reference signs, and the description thereof will be omitted.

The curled portion 140$c$ includes a rear end portion 140$r$ which is at the rearmost position with respect to the vehicle. The end surface 40$t$ is located forward of the rear end portion 140$r$ with respect to the vehicle. Thus, even when the first specific edge E1 comes into contact with the cable 24, it is possible to prevent the end surface 40$t$ from coming into contact with the cable 24. Further, a radius of curvature R2 of the curled portion 140$c$ is set to be equal to or greater than the thickness T1 of the base portion 40$b$. Thus, by spreading a load applied to the cable 24, damage to the cable 24 can be suppressed.

Second Embodiment

Figure 6A:
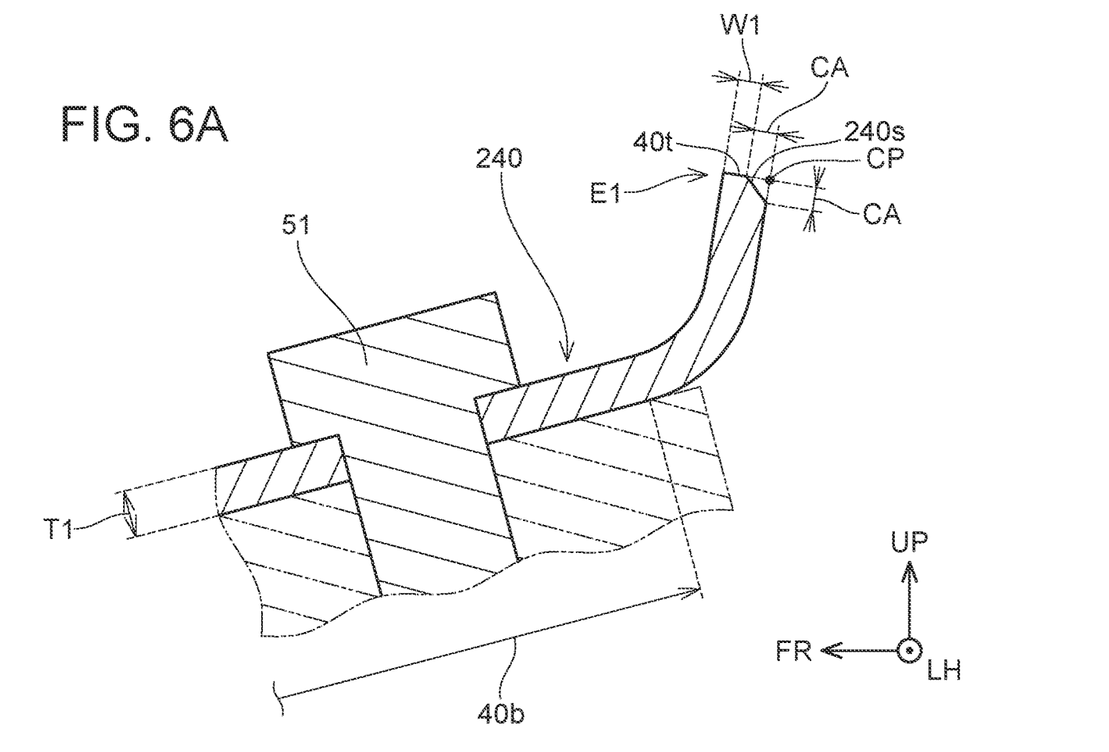
FIG. 6A is a cross-sectional views of rear bracket 240.

FIG. 6A is a cross-sectional view of a rear bracket 240 of a second embodiment. FIG. 6A is a cross-sectional view at a position similar to that of FIG. 4A, and is an enlarged view of the end surface 40$t$ and its vicinity. In the first embodiment, the curled portion 40$c$ (FIG. 4A) is formed at the first specific edge E1 by a curling process. In the second embodiment, the first specific edge E1 is chamfered in place of being curled. It should be noted that parts common to the first embodiment and the second embodiment are denoted by common reference signs, and the description thereof will be omitted.

The end surface 40$t$ of the first specific edge E1 is at the rearmost position with respect to the vehicle. A corner portion CP of the end surface 40$t$ closer to the rear of the vehicle is chamfered. In FIG. 6A, the portion removed by the chamfering is indicated by a one-dot-chain line. Specifically, a portion away from the corner portion CP by a chamfer amount CA is filed at 45°. Thus, a chamfered surface 240$s$ is defined. The chamfer amount CA of the chamfering is equal to or less than half of the thickness T1 of the base portion 40$b$.

Effect

The chamfered surface 240$s$ can be defined at the end surface 40$t$ by chamfering. This makes it possible to suitably increase the contact area when the end surface 40$t$ comes into contact with the cable 24. By spreading a load applied to the cable 24, damage to the cable 24 can be suppressed.

In addition, by setting the chamfer amount CA to be equal to or less than half of the thickness T1, a width W1 of the remaining end surface 40$t$ in the thickness direction will not be narrower than necessary. This also makes it possible to suitably increase the contact area when the end surface 40$t$ comes into contact with the cable 24.

Variant of Second Embodiment

Figure 6B:
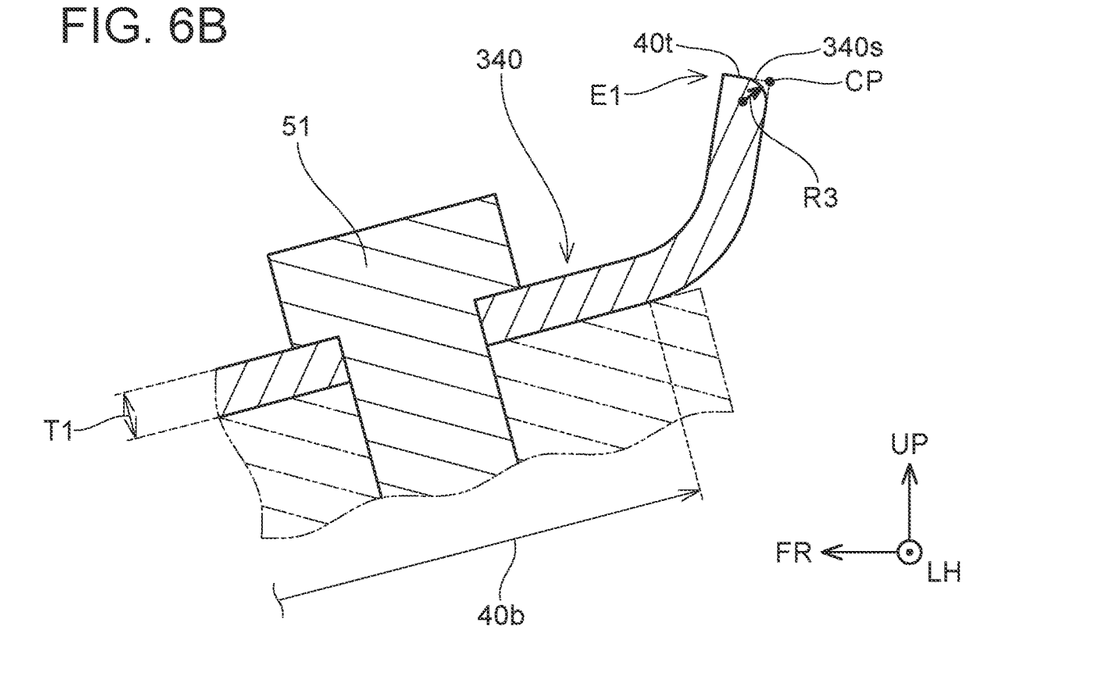
FIG. 6B is a cross-sectional views of rear bracket 340.

FIG. 6B illustrates a cross-sectional view of a rear bracket 340 of a variant. FIG. 6B is a cross-sectional view at a position similar to that of FIG. 6A. It should be noted that parts common to the second embodiment and the present variant are denoted by common reference signs, and the description thereof will be omitted.

In the variant of FIG. 6B, the corner portion CP is rounded with a radius of curvature R3. Thus, a round surface 340$s$ is defined. The radius of curvature R3 is equal to or less than half of the thickness T1 of the base portion 40$b$. Since the round surface 340$s$ is defined, the contact area when the end surface 40$t$ comes into contact with the cable 24 can be appropriately increased.

(Modification)

The first specific edge E1 may not include the upright wall portion 40$w$. For example, the curled portion 40$c$, the chamfered surface 240$s$, the round surface 340$s$, or the like may be formed at the end portion of the base portion 40$b$ closer to the rear of the vehicle.

The edge to be chamfered or rounded is not limited to the first specific edge E1. It is possible to flexibly determine an area of the edge to be chamfered in consideration of a collision and variations in processing.

A portion to which the cable 24 is connected is not limited to the high-voltage battery, and may be different part(s).

The first specific edge E1 may be both curled and chamfered.

The motor housing 30 is an example of a power unit.

What is claimed is:

1. A vehicle comprising:
   a body including a front compartment;
   a power unit disposed in the front compartment and accommodating at least a traction motor;
   an electric power control unit disposed on an upper surface of the power unit and configured to supply electric power to the traction motor;
   a rear bracket located behind the electric power control unit in a vehicle front-rear direction and fixing the electric power control unit to the power unit; and
   a cable connected to the electric power control unit and configured to supply high voltage electric power to the electric power control unit,
   wherein
   the rear bracket comprises a plate-shaped base portion and a support portion, the base portion is located along an upper surface of the power unit, and the support portion extends upward from the base portion and is located along a rear surface of the electric power control unit, and
   an outer peripheral edge of the base portion includes a first specific edge that extends along a vehicle width direction and opposes the cable in the vehicle front-rear direction, and the first specific edge is curled or chamfered.

2. The vehicle according to claim 1, wherein
   the first specific edge is curled with a radius of curvature equal to or greater than a thickness of the base portion.

3. The vehicle according to claim 2, wherein
   the first specific edge is curled such that an end surface of the first specific edge is not at a rearmost position in the vehicle front-rear direction.

4. The vehicle according to claim 3, wherein
   the outer peripheral edge of the base portion further includes a second specific edge extending along the vehicle width direction and opposing the cable in the vehicle front-rear direction, and
   the second specific edge is located forward of the first specific edge in the vehicle front-rear direction, and the second specific edge is not curled.

5. The vehicle according to claim 1, wherein
   the first specific edge is chamfered by a chamfer amount equal to or less than half of a thickness of the base portion.

* * * * *